(12) United States Patent
Ogawa

(10) Patent No.: US 10,270,076 B2
(45) Date of Patent: Apr. 23, 2019

(54) SPACER

(71) Applicant: FDK CORPORATION, Minato-ku, Tokyo (JP)

(72) Inventor: Yusuke Ogawa, Tokyo (JP)

(73) Assignee: FDK CORPORATION, Tokyo (JP)

(*) Notice: Subject to any disclaimer, the term of this patent is extended or adjusted under 35 U.S.C. 154(b) by 465 days.

(21) Appl. No.: 14/894,303

(22) PCT Filed: Apr. 11, 2014

(86) PCT No.: PCT/JP2014/060491
§ 371 (c)(1),
(2) Date: Nov. 25, 2015

(87) PCT Pub. No.: WO2014/192440
PCT Pub. Date: Dec. 4, 2014

(65) Prior Publication Data
US 2016/0133904 A1 May 12, 2016

(30) Foreign Application Priority Data
May 30, 2013 (JP) .................. 2013-113692

(51) Int. Cl.
*H01M 2/18* (2006.01)
*H01M 2/10* (2006.01)

(52) U.S. Cl.
CPC ........... *H01M 2/18* (2013.01); *H01M 2/1016* (2013.01); *H01M 2/1077* (2013.01); *H01M 2220/10* (2013.01)

(58) Field of Classification Search
CPC ..... H01M 2/18; H01M 2/1016; H01M 2/1077
USPC ....................................... 429/156
See application file for complete search history.

(56) References Cited

U.S. PATENT DOCUMENTS

2012/0263991 A1* 10/2012 Temmyo ............. H01M 2/1077
429/120
2013/0316212 A1* 11/2013 Lee ..................... H01M 2/0245
429/99

FOREIGN PATENT DOCUMENTS

| JP | 2010-123412 A | 6/2010 | |
|---|---|---|---|
| JP | 2011-134709 A | 7/2011 | |
| JP | WO 2012073415 A1 * | 6/2012 | .......... H01M 2/1077 |
| JP | 2013-12466 | 1/2013 | |
| JP | 2013-30384 | 2/2013 | |
| WO | WO-2011/128949 A1 | 10/2011 | |

(Continued)

OTHER PUBLICATIONS

Search Report for PCT/JP2014/060491, dated May 13, 2014.

*Primary Examiner* — Cynthia H Kelly
*Assistant Examiner* — Rashid A Alam
(74) *Attorney, Agent, or Firm* — Kinney & Lange, P.A.

(57) ABSTRACT

A spacer in a square shape and includes an upper groove section provided on an upper surface, and a lower groove section provided on a lower surface. The upper groove section includes a first upper groove fittable with a first lower end edge of a first frame of a battery module located on the upper side, and a second upper groove fittable with a second lower end edge of a second frame of the battery module located on the upper side. The lower groove section includes a first lower groove fittable with a first upper end edge of the first frame of the battery module located on the lower side, and a second lower groove fittable with a second upper end edge of the second frame of the battery module located on the lower side.

2 Claims, 9 Drawing Sheets

(56) References Cited

FOREIGN PATENT DOCUMENTS

| WO | WO-2012/073415 A1 | 6/2012 |
| WO | WO-2012/173233 A1 | 12/2012 |
| WO | WO-2013/018286 A1 | 2/2013 |

\* cited by examiner

SPACER

TECHNICAL FIELD

The present invention relates to a spacer, and more particularly, to a spacer which, in a device configured by stacking a plurality of modules, is interposed between adjacent modules.

BACKGROUND ART

Various devices are incorporated in an electric apparatus. Usually, these devices, each of which is configured by stacking a plurality of modules, are accommodated in the electrical apparatus.

When the above-described modules are simply stacked, sufficient stability cannot be obtained, and hence a spacer is generally interposed between adjacent modules.

Here, as a device mounted on an electrical apparatus, there is, for example, a battery pack device used for a backup power source. This battery pack device is formed in such a manner that a plurality of battery modules, in each of which many general-purpose batteries are connected in parallel or in series to be able to provide a predetermined voltage and capacity, are combined for use. In this battery module, each general-purpose battery is fixed in a manner of being housed in a case, or being sandwiched between a pair of frames. The battery modules are stacked, for example, by providing a spacer therebetween. The battery pack device is formed in this way (see for example, Patent Document 1).

PRIOR ART DOCUMENT

Patent Document

Patent Document 1: International Publication No. WO 2012/073415

SUMMARY OF THE INVENTION

Problems to be Solved by the Invention

Meanwhile, in the case of the battery pack device described in Patent Document 1, the spacers, each sandwiched between the adjacent cases, are respectively screwed to connecting members. In this case, since the number of components is large, and since the number of assembly steps is also increased by screwing, the production efficiency is low.

Further, in the case of a battery module using a pair of frames, the shapes of portions of the frames on both sides, the portions being in contact with the spacer, are different from each other. In this case, it is necessary to prepare a spacer having a shape corresponding to each of the frames. That is, kinds of components are increased, and hence the production cost is increased.

The present invention has been made in the above-described circumstance and an object of the present invention is to provide a spacer by which, in production of a battery pack device, the number and kinds of components can be reduced and also the number of assembly steps can be reduced.

Means for Solving the Problems

In order to achieve the above described object, according to the present invention, there is provided a spacer provided between stacked battery modules, each battery module being provided with a plate-shaped first frame, a plate-shaped second frame, and a plurality of batteries provided between a plate surface of the first frame and a plate surface of the second frame, the spacer being formed in a square bar shape and including an upper groove section provided on an upper surface of the spacer, and a lower groove section provided on a lower surface of the spacer, wherein the upper groove section includes a first upper groove shaped to be fittable with a lower end edge of the first frame of a battery module of the battery modules located on an upper side, and a second upper groove shaped to be fittable with a lower end edge of the second frame of the battery module located on the upper side, and the lower groove section includes a first lower groove shaped to be fittable with an upper end edge of the first frame of a battery module of the battery modules located on a lower side, and a second lower groove shaped to be fittable with an upper end edge of the second frame of the battery module located on the lower side.

The spacer according to the present invention is a single member provided with the first upper groove, the second upper groove, the first lower groove, and the second lower groove. In a specific use of the spacer according to the present invention, first, the two spacers of the present invention, which have the same shape, are prepared. Then, in one of the spacers, the lower end edge of the first frame is fitted into the first upper groove, and the upper end edge of the first frame is fitted into the first lower groove. Further, in the other of the spacers, the lower end edge of the second frame is fitted into the second upper groove, and the upper end edge of the second frame is fitted into the second lower groove. In this way, with the spacer according to the present invention, one kind of the spacer can be used for both the first frame and the second frame, and hence the number of components can be reduced.

Further, since the end edge of each of the first frame and the second frame can be fitted into the spacer according to the present invention, it is not necessary that each of the first frame and the second frame is screwed via a connecting member. Therefore, the number of assembly steps can be reduced.

Further, it is preferable that the above-described battery modules each include positioning convex sections used for performing positioning at an intended installation position, and receiving concave sections capable of respectively receiving the positioning convex sections are provided in the first upper groove, the second upper groove, the first lower groove, and the second lower groove at respective portions corresponding to the positioning convex sections.

Even when the positioning convex sections are formed in the battery module, since, in the spacer configured in this way, the receiving concave sections capable of receiving the positioning convex sections are provided in the portions of the first upper groove, the second upper groove, the first lower groove, and the second lower groove of the spacer, the portions corresponding to the positioning convex sections, the positioning convex sections are prevented from being partially collided with the groove bottom of the upper groove or the lower groove, so that the battery module can be stably stacked, and hence the battery pack device can be easily assembled.

Advantageous Effects of the Invention

According to the present invention, it is possible to provide a spacer by which, in the production of the battery pack device, the number and kinds of components can be reduced, and the number of assembly steps can also be reduced.

MODE FOR CARRYING OUT THE INVENTION

In the following, a battery pack device 4, to which a spacer 2 according to the present invention is applied, will be described with reference to the accompanying drawings.

Figure 1:
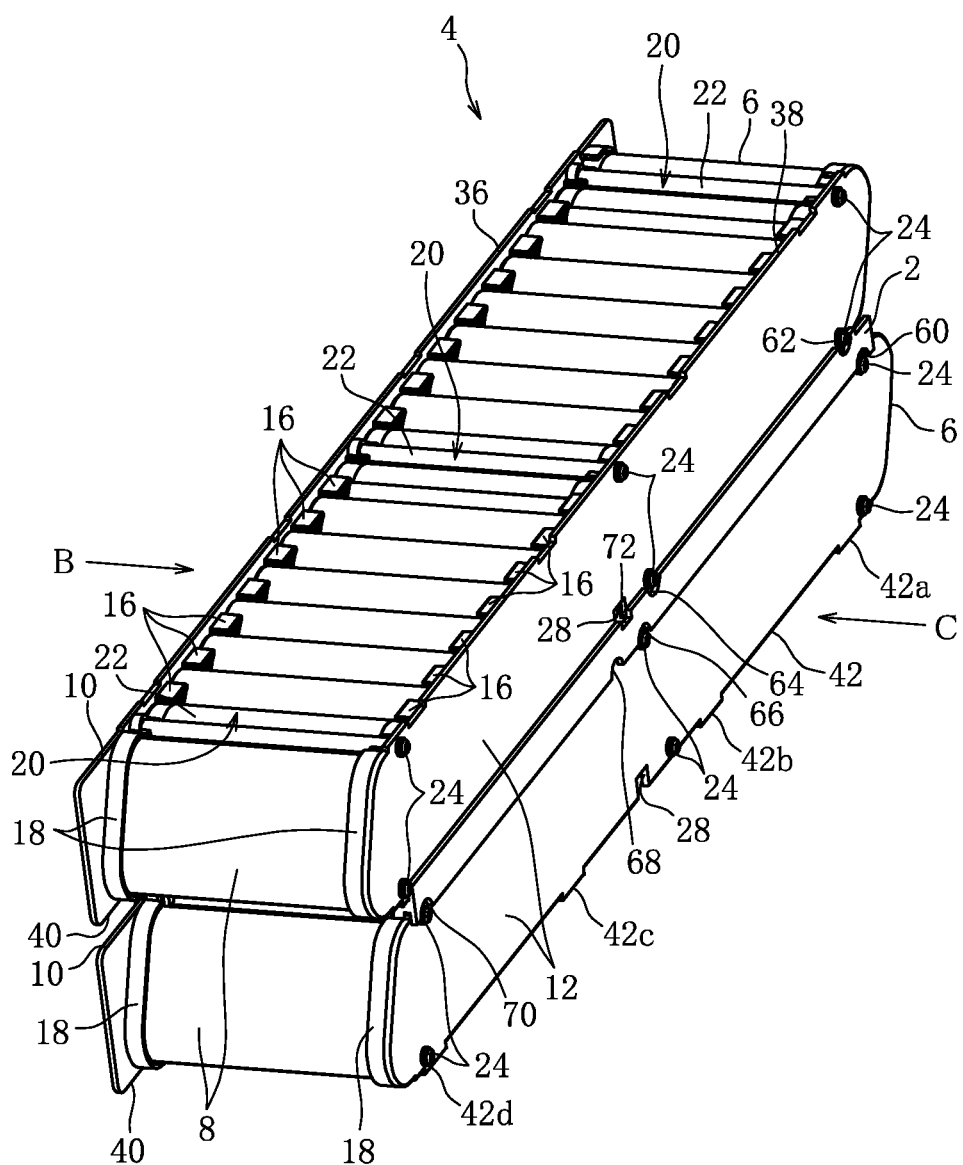
FIG. 1 is a perspective view showing a battery pack device according to an embodiment.

As shown in FIG. 1, the battery pack device 4 is formed by stacking two battery modules 6 and 6 via the square bar-shaped spacers 2 and 2. It should be noted that the square bar-shape means a long rod-shaped form having a rectangular cross-section.

The battery pack device 4 is housed in a housing space of an electrical apparatus. Usually, the housing space includes a floor surface having a predetermined area, support posts provided at predetermined positions on the floor surface, and a pressing plate attached to the support posts. Further, the battery pack device 4 is placed on the floor surface of the housing space, and is fixed by being pressed down by the pressing plate.

Next, the configuration of the battery module 6 will be described below.

Figure 2:
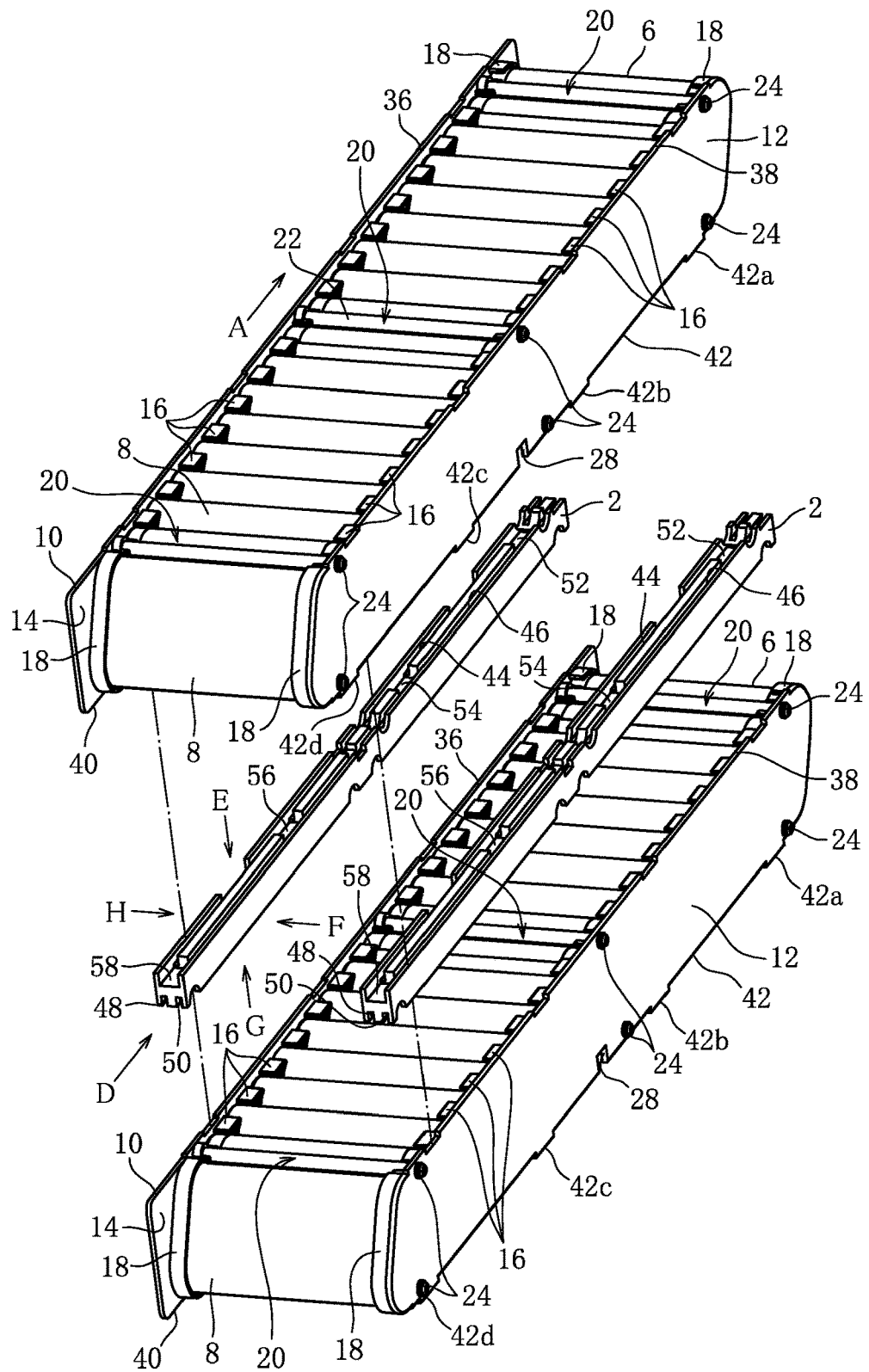
FIG. 2 is a perspective view showing the disassembled battery pack device according to the embodiment.

As shown in FIG. 2, the battery module 6 is formed in such a manner that a plurality of battery packs 8 are arranged between a first frame 10 and a second frame 12 so as to be sandwiched between the first frame 10 and the second frame 12.

In the battery pack 8, pairs of general-purpose AA-size nickel-hydrogen secondary batteries (hereinafter referred to as unit batteries) are arranged in parallel and are integrated by being encased by an outer package film. The unit batteries are arranged in such a manner that the positive and negative electrode terminals of one of the two unit batteries respectively face the negative and positive electrode terminals of the other of the two unit batteries, and that the negative electrode terminal of the one of the two unit batteries and the positive electrode terminal of the other of the two unit batteries are electrically connected in series by a lead (not shown). Further, the positive electrode terminal of one of the unit batteries and the negative electrode terminal of the other of the unit batteries are exposed from the outer package film. Eighteen pieces of the battery packs 8 arranged in this way are prepared and arranged so that the body portions of the adjacent battery packs 8 are brought into contact with each other. In this way, an assembly of the battery packs 8 is formed. At this time, as is apparent from FIG. 2, the battery packs are respectively arranged in a state of being tilted in the arrow A direction. Further, the battery packs 8 are sandwiched and fixed between the first frame 10 and the second frame 12.

The first frame 10 is located on the left side in FIG. 2 and is an approximately rectangular plate-shaped body. In the first frame 10, as is apparent from FIG. 2, a plurality of pressing projections 16, each having a substantially triangular cross section, are provided on an inner surface 14 on the side of the battery pack 8. The pressing projection 16 is positioned at a predetermined position between the battery pack 8 and the battery pack 8, so that a portion of the pressing projection 16, the portion being in contact with the battery pack 8, is formed along a part of the outer peripheral edge of the battery pack 8. Thereby, the pressing projection 16 serves to prevent the battery pack 8 from being shifted in the upper-lower direction of the battery module 6. Further, as is apparent from FIG. 2, an end stopper 18 is formed in proximity to each of both longitudinal direction ends of the first frame 10. The end stopper 18 is a frame formed to match the outer peripheral edge of the body portion of the battery pack 8, and serves to prevent the battery pack 8 located at the outermost end from being shifted in the front-rear direction of the battery modules 6.

Further, the second frame 12 is an approximate parallelogram-shaped plate-shaped body located on the right side in FIG. 2. Similarly to the first frame 10, the second frame 12 is provided with the pressing projections 16 and the end stoppers 18. The pressing projections 16 of the second frame 12, each having the same shape as the pressing projection 16 of the first frame 10, are respectively positioned at positions opposite to the pressing projections 16 of the first frame 10. Further, the end stopper 18 of the second frame 12, each also having the same shape as the end stopper 18 of the first frame 10, are respectively positioned at positions opposite to the end stoppers 18 of the first frame 10.

As described above, the first frame 10 and the second frame 12 are arranged to face each other so that the pressing projections 16 and the end stoppers 18 of the first frame 10 are respectively positioned to face the pressing projections 16 and the end stoppers 18 of the second frame 12. Thereby, the pressing projections 16 and the end stoppers 18 of the first frame 10 cooperate with the pressing projections 16 and the end stoppers 18 of the second frame 12, so that the battery packs 8 can be positioned.

As described above, the first frame 10 and the second frame 12, which position the battery packs 8 at the predetermined positions, are connected with each other by connecting members 20. The connecting member 20 is configured by a hollow cylindrical member 22 having a center through hole extending in the longitudinal direction, a bolt 24 inserted into the center through hole, and a nut 26 screwed to the bolt. The cylindrical member 22 has substantially the same longitudinal length as the above-described battery pack 8, and is arranged at a position corresponding to the bolt insertion hole provided at a predetermined position of each of the first frame 10 and the second frame 12. The above-described bolt 24 is inserted into the through hole on the side of the first frame 10 from the side of the bolt insertion hole on the side of the second frame 12 via the center through hole of the connecting member 20. Also, the nut 26 is screwed to the distal end of the bolt 24 projected from the bolt insertion hole on the side of the first frame 10. Thereby, the first frame 10 and the second frame 12 are urged in the mutually approaching direction, so that the battery module 6, in which the battery packs 8 are respectively sandwiched between the first frame 10 and the second frame 12, is formed.

Here, the battery packs 8, sandwiched between the first frame 10 and the second frame 12 and arranged respectively at the predetermined positions, are electrically connected in series by frame leads (not shown) provided on the first frame 10 or the second frame 12. Further, as shown in FIG. 2, the second frame 12 is provided with a connector cutout 28. A female connector (not shown) is provided inside a portion of the connector cutout 28, and the above-described frame lead (not shown) is electrically connected to the female connector. Also, a male connector (not shown) is inserted into the female connector, and a lead wire (not shown) connected to the male connector is drawn out from the connector cutout 28. In the battery module 6, electrical input and output are performed via the male connector and the lead wire.

As described above, the first frame 10 is positioned on one side of the battery module 6, and the second frame 12 is positioned on the other side of the battery module 6. Further, in side view of the battery module 6, the assembly of the battery packs 8 is hidden by the first frames 10 and the second frame 12 (see FIG. 3 and FIG. 4). That is, the first frames 10 and the second frame 12 are projected from the assembly of the battery packs 8. Specifically, as shown in the sectional view of FIG. 5, when, in the cross section of the battery pack 8, the upper end of a body section 30 is formed as a body section upper end 32, and when the lower end of the body section 30 is formed as a body section lower end 34, upper end edges 36 and 38 of the first frame 10 and the second frame 12 are projected slightly upward from the body section upper end 32, and lower end edges 40 and 42 of the first frame 10 and the second frame 12 are projected slightly downward from the body section lower end 34. More specifically, the upper end edge (hereinafter referred to as first upper end edge) 36 of the first frame 10 is projected above the body section upper end 32 of the battery pack 8, and the lower end edge (hereinafter referred to as first lower end edge) 40 of the first frame 10 is projected below the body section lower end 34 of the battery pack 8. Further, the upper end edge (hereinafter referred to as second upper end edge) 38 of the second frame 12 is projected above the body section upper end 32 of the battery pack 8, and the lower end edge (hereinafter referred to as second lower end edge) 42 of the second frame 12 is projects below the body section lower end 34 of the battery pack 8.

Figure 3:
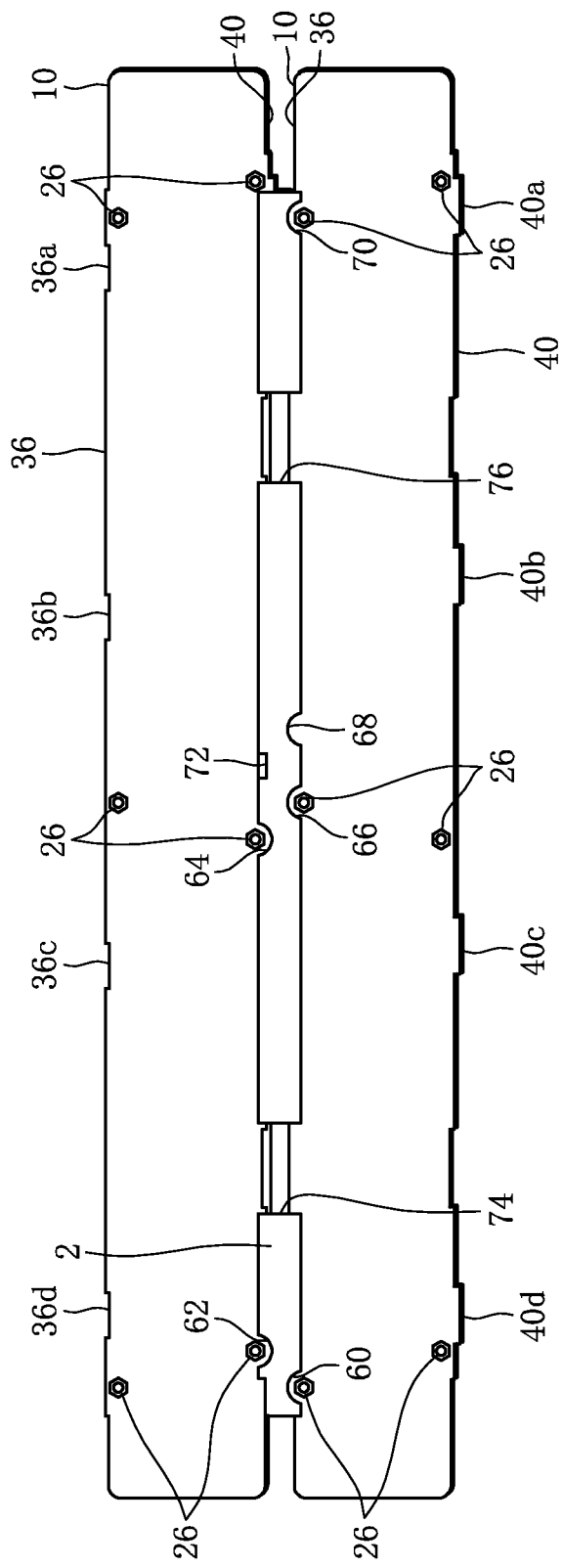
FIG. 3 is a side view of the battery pack device viewed in the arrow B direction in FIG. 1.
Figure 4:
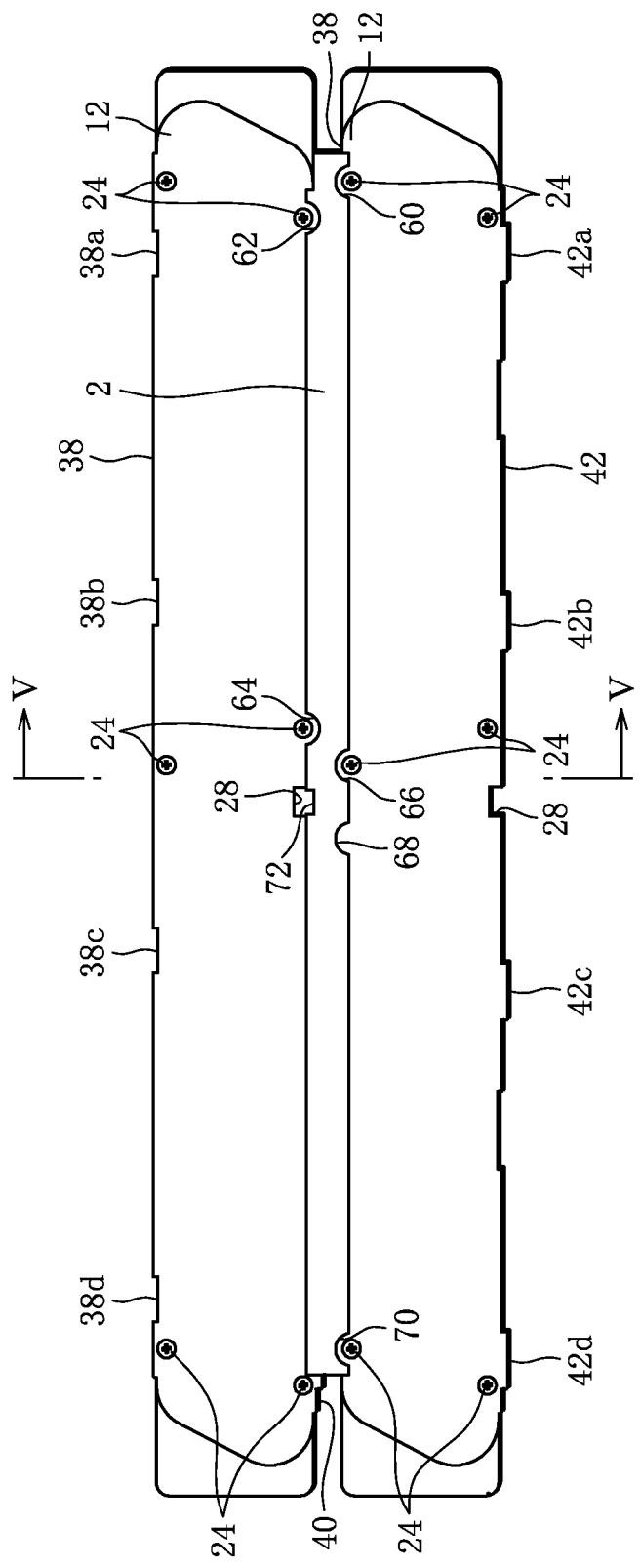
FIG. 4 is a side view of the battery pack device viewed in the arrow C direction in FIG. 1.

Here, as it is apparent from FIG. 3 and FIG. 4, the first upper end edge 36 is provided with concave sections denoted by reference numerals 36a, 36b, 36c and 36d, and the second upper end edge 38 is provided with concave sections denoted by reference numerals 38a, 38b, 38c and 38d. These concave sections are provided to avoid the convex sections provided on the pressing plate in the housing space.

Further, as it is apparent from FIG. 3 and FIG. 4, the first lower end edge 40 is provided with positioning convex sections denoted by reference numerals 40a, 40b, 40c and 40d, and the second lower end edge 42 is provided with positioning convex sections denoted by reference numerals 42a, 42b, 42c and 42d. The positioning convex sections 40a, 40b, 40c, 40d, 42a, 42b, 42c and 42d are fitted in concave sections provided at predetermined positions of the floor surface of the housing space, so as to be used for positioning the lowermost battery module 6, that is, for positioning the battery pack device 4.

Usually, the position and size of each of the concave sections 36a, 36b, 36c and 36d formed on the first upper end edge 36 are different from the position and size of each of the positioning convex sections 40a, 40b, 40c and 40d formed on the first lower end edge 40. Also, the position and size of each of the concave sections 38a, 38b, 38c and 38d formed on the second upper end edge 38 are different from the position and size of each of the positioning convex sections 42a, 42b, 42c and 42d formed on the second lower end edge 42. Therefore, when the battery modules 6 are directly stacked, the upper end edge and the lower end edge of the frame are respectively partially collided with the lower end edge and the upper end edge of the adjacent frame, and hence, it is difficult that the battery modules 6 are stably stacked. For this reason, the spacers 2 are interposed between the battery modules 6.

Figure 6:
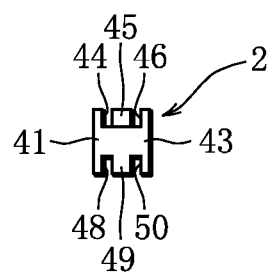
FIG. 6 is an end view showing a state in which the spacer according to the embodiment is viewed in the arrow D direction in FIG. 2.

As shown in FIG. 2, a spacer 2, which is a long square bar having a rectangular cross-section, is provided with four concave grooves in total extending in the longitudinal direction so that two of the concave grooves are provided on each of the upper and lower sections of the spacer 2. Specifically, as is apparent from the end view showing in FIG. 6, the spacer 2 is provided with a first upper groove 44 positioned on the left upper side in FIG. 6, a second upper groove 46 positioned on the right upper side in FIG. 6, a first lower groove 48 positioned on the left lower side in FIG. 6, a second lower groove 50 positioned on the right lower side in FIG. 6, a first side wall 41 positioned on the left side of the first upper groove 44 and the first lower groove 48 in FIG. 6, a second side wall 43 positioned on the right side of the second upper groove 46 and the second lower groove 50 in FIG. 6, an upper partition wall 45 separating the first upper groove 44 from the second upper groove 46, and a lower partition wall 49 separating the first lower groove 48 from the second lower groove 50.

Figure 5:
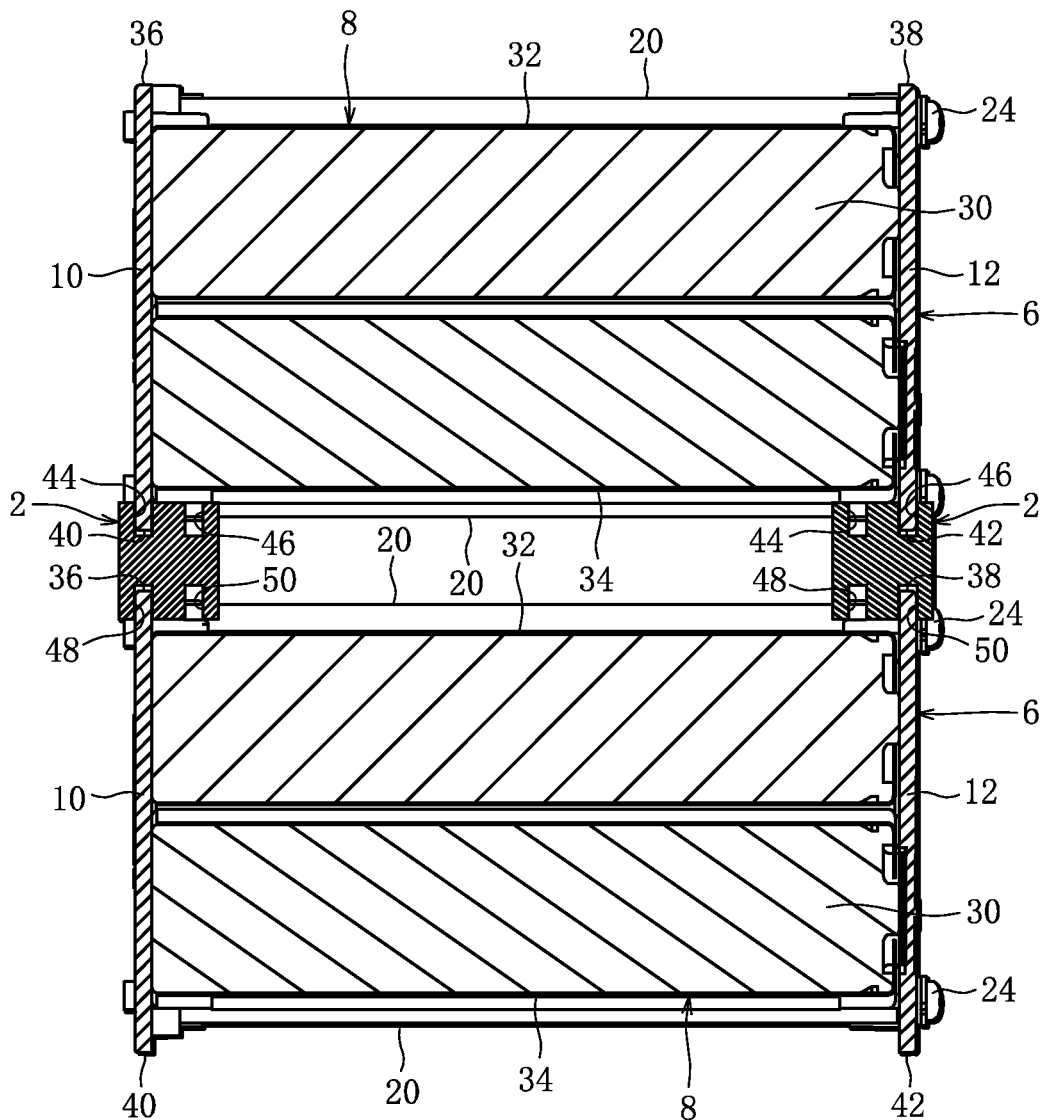
FIG. 5 is a cross-sectional view along line V-V in FIG. 4.

As shown in FIG. 5, the first upper groove 44 can be fitted with the first lower end edge 40 of the first frame 10.

As shown in FIG. 5, the second upper groove 46 can be fitted with the second lower end edge 42 of the second frame 12.

As shown in FIG. 5, the first lower groove 48 can be fitted with the first upper end edge 36 of the first frame 10.

As shown in FIG. 5, the second lower groove 50 can be fitted with the second upper end edge 38 of the second frame 12.

Figure 7:
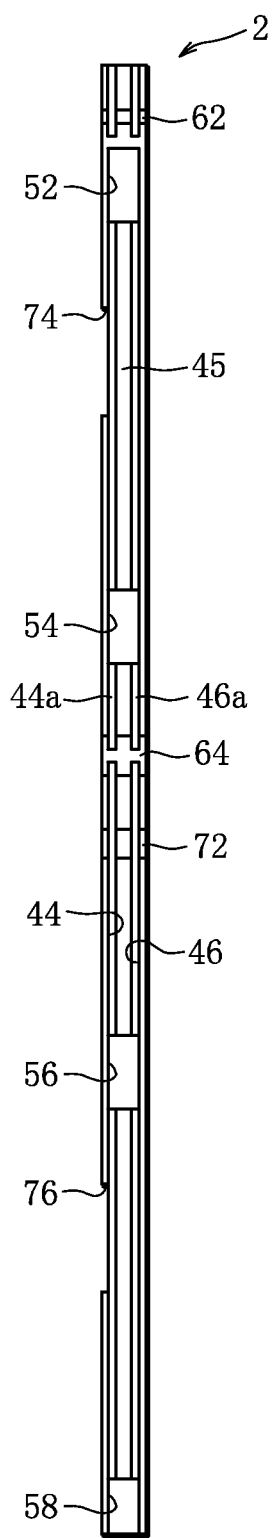
FIG. 7 is a top view showing a state in which the spacer according to the embodiment is viewed in the arrow E direction in FIG. 2.

In the spacer 2, as is apparent from the top view showing in FIG. 7, receiving concave sections 52, 54, 56 and 58 are provided at predetermined positions on the upper side on which the first upper groove 44 and the second upper groove 46 are provided. Specifically, the receiving concave sections 52, 54, 56 and 58 are respectively formed at concave section forming positions which respectively correspond to the positioning convex sections 40a, 40b, 40c and 40d provided on the first lower end edge 40 of the first frame 10, and which respectively correspond to the positioning convex sections 42a, 42b, 42c and 42d provided on the second lower end edge 42 of the second frame 12. More specifically, at each of the concave section forming position, the upper partition wall 45 is removed, and further, the portion where the upper partition wall 45 is removed, a portion of a groove bottom 44a of the first upper groove 44, and a portion of a groove bottom 46a of the second upper groove 46 form a recess (each of the receiving concave sections 52, 54, 56 and 58) which is dug down toward a back side to a predetermined depth corresponding to the height of the positioning convex sections (40a, 40b, 40c, 40d, 42a, 42b, 42c, and 42d). As is apparent from FIG. 7, each of the receiving concave sections 52, 54, 56 and 58 has a rectangular shape in plan view. Here, the receiving concave section 52 receives the positioning convex sections 40a and 42a, and the receiving concave section 54 receives the positioning convex sections 40b and 42b. Further, the receiving concave section 56 receives the positioning convex sections 40c and 42c, and the receiving concave section 58 receives the positioning convex sections 40d and 42d.

Figure 8:
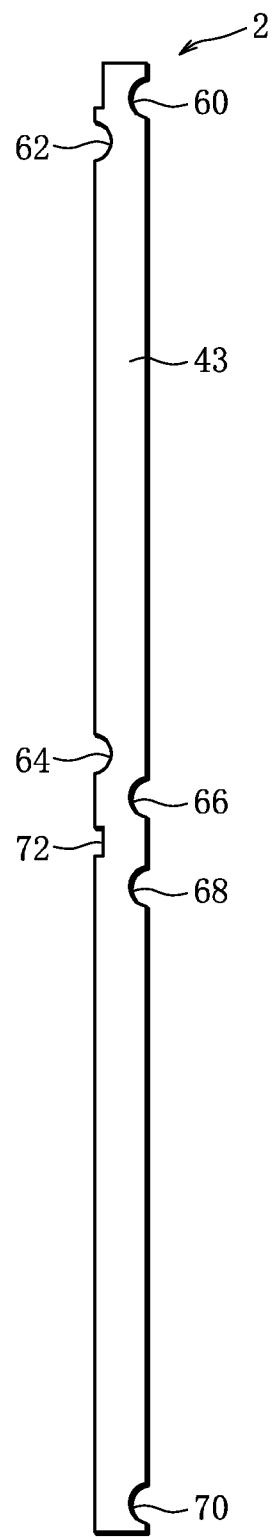
FIG. 8 is a right side view showing a state in which the spacer according to the embodiment is viewed in the arrow F direction in FIG. 2.

Next, as is apparent from the FIG. 8 showing the right side surface of the spacer 2, the spacer 2 is provided with cutouts, each of which, at a predetermined position, penetrates the right side wall 43, the upper partition wall 45, the lower partition wall 49 and the left side wall 41. Specifically, semicircle cutouts denoted by reference numerals of 60, 62, 64, 66, 68 and 70, and a rectangular cutout denoted by reference numeral of 72 are provided. The semicircle cutouts are positioned at positions corresponding to the bolts 24 or the nut 26, so as to avoid the bolt 24 and the nut 26. Further, the rectangular cutout 72 is positioned at a position corresponding to the connector cutout 28, so as to avoid the connector cutout 28.

Figure 9:
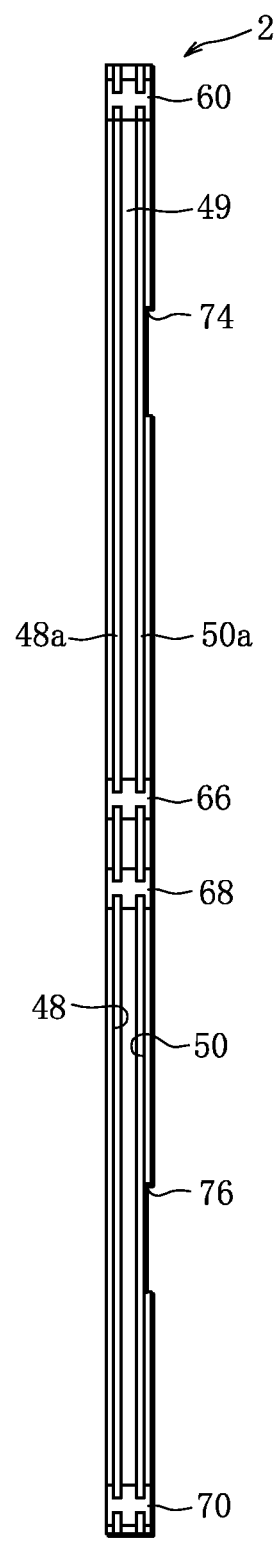
FIG. 9 is a bottom view showing a state in which the spacer according to the embodiment is viewed in the arrow G direction in FIG. 2.

Next, as is apparent from the FIG. 9 showing the lower surface of the spacer 2, on the lower surface side of the spacer 2, the first lower groove 48 and the second lower groove 50 are extended in parallel with each other, and concave sections corresponding to the receiving concave sections 52, 54, 56 and 58 on the upper surface side are not provided. Here, reference numeral 48a denotes a groove bottom of the first lower groove 48, and reference numeral 50a denotes a groove bottom of the second lower groove 50.

Figure 10:
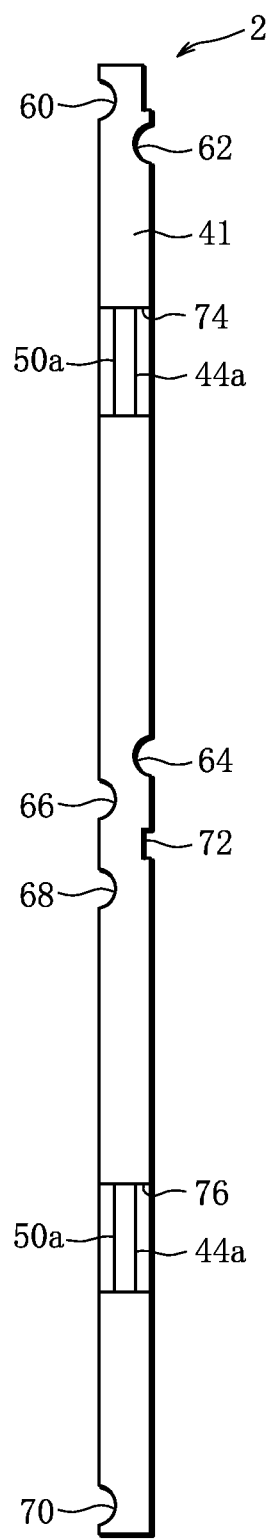
FIG. 10 is a left side view showing a state in which the spacer according to the embodiment is viewed in the arrow H direction in FIG. 2.

Next, as is apparent from FIG. 10 showing the left side surface of the spacer 2, side section cutouts 74 and 76 are formed in the first side wall 41. The side section cutouts 74 and 76 are formed by vertically removing the portions of the first side wall 41 of the spacer 2, the portions corresponding to the above-described support posts.

The spacers 2 each having the same shape are used in pairs. For example, when the two battery modules 6 are stacked, as shown in FIG. 5, the spacers 2 and 2 are provided respectively on the side of the first frame 10 (left side in FIG. 5) and the side of the second frame 12 (right side in FIG. 5) between the upper battery module 6 and the lower battery module 6. Further, the first lower end edge 40 of the first frame 10 of the upper battery module 6 is fitted into the first upper groove 44 of one of the spacers 2, and the first upper end edge 36 of the first frame 10 of the lower battery module 6 is fitted into the first lower groove 48 of the spacer 2. On the other hand, the second lower end edge 42 of the second frame 12 of the upper battery module 6 is fitted into the second upper groove 46 of the other of the spacers 2, and the second upper end edge 38 of the second frame 12 of the lower battery module 6 is fitted into the second lower groove 50 of the spacer 2.

At this time, the receiving concave sections 52, 54, 56 and 58, formed on the upper side of the one spacer 2 on which the first upper groove 44 and the second upper groove 46 are provided, receive the positioning convex sections 40a, 40b, 40c and 40d provided on the first lower end edge 40 of the first frame 10. Also, the receiving concave sections 52, 54, 56 and 58, formed on the upper side of the other spacer 2 on which the first upper groove 44 and the second upper groove 46 are provided, receive the positioning convex sections 42a, 42b, 42c and 42d provided on the second lower end edge 42 of the second frame 12. Thereby, the positioning convex sections are prevented from being partially collided with the groove bottoms 44a and 46a. Further, as described above, the first upper end edge 36 of the first frame 10 is provided only with the concave sections 36a, 36b, 36c and 36d, and hence, is not partially collided with the groove bottoms 48a of the first lower groove 48 of the one spacer 2, and the second upper end edge 38 of the second frame 12 is provided only with the concave sections 38a, 38b, 38c and 38d, and hence, is not partially collided with the groove bottoms 50a of the second lower groove 50 of the other spacer 2. Further, as shown in FIG. 3 and FIG. 4, each of the semicircle cutouts 60, 62, 64, 66, 68 and 70 is provided on the spacer 2, so as to avoid the bolt 24 and the nut 26. Thereby, the bolt 24 or the nut 26 is prevented from being collided with the spacer 2. Further, the rectangular cutout 72 is formed to avoid the connector cutout 28. Thereby, the rectangular cutout 72 and the connector cutout 28 are made to communicate with each other, so that the insertion and removal of the connector or the drawing of the lead wire of the connector can be effectively prevented.

As described above, the battery modules 6 and 6 are stably stacked via the spacers 2 and 2. Thereby, the battery pack device 4 is formed. The obtained battery pack device 4 is housed in a housing space of an electrical apparatus. At this time, the positioning convex sections 40a, 40b, 40c and 40d formed at the lower end edge 40 of the first frame 10 of the lower battery module 6, and the positioning convex sections 42a, 42b, 42c and 42d formed at the lower end edge 42 of the second frame 12 of the lower battery module 6 are fitted into the positioning holes provided in the floor surface of the housing space. Also, the upper battery module 6 is pressed from above and fixed by the pressing plate attached to the support posts provided on the floor surface. In this way, the battery pack device 4 is housed in the electrical apparatus.

According to the present invention, the spacers 2 of only one kind can correspond to the first lower end edge 40 and the first upper end edge 36 of the first frame 10, and correspond to the second lower end edge 42 and the second upper end edge 38 of the second frame 12, as a result of which the battery modules, each provided with frames having different upper and lower shapes, can be easily stacked, and also the number of components can be reduced.

Here, when a larger floor area of the housing space of the electrical apparatus can be secured, a larger number of the battery pack devices 4 can be mounted. For example, when the housing space has a width of 450 mm, a depth of 460 mm, and a height of 93.5 mm, the six battery pack devices 4 can be mounted. In the case of the present invention, since the two battery modules 6 can be easily stacked, it is possible to easily construct a power supply having a capacity which is twice as compared with the case where the one battery module 6 is mounted.

Further, in the present embodiment, the case, in which the two battery modules 6 and 6 are stacked, is explained, but the present invention is not limited to this embodiment. The spacers 2 according to the present invention can also correspond to the case in which the two or more battery modules 6 are stacked.

EXPLANATION OF REFERENCE SIGNS

2 Spacer
4 Battery pack device
6 Battery module
8 Battery pack

10 First frame
12 Second frame
36 First upper end edge
38 Second upper end edge
40 First lower end edge
42 Second lower end edge
40a-40d Positioning convex section
42a-42d Positioning convex section
44 First upper groove
46 Second upper groove
48 First lower groove
50 Second lower groove
52, 54, 56, 58 Receiving concave section

The invention claimed is:

1. A spacer provided between stacked battery modules, each battery module being provided with a plate-shaped first frame, a plate-shaped second frame, and a plurality of batteries provided between a plate surface of the first frame and a plate surface of the second frame, the spacer being formed in a square bar shape and including an upper groove section provided on an upper surface of the spacer, and a lower groove section provided on a lower surface of the spacer, wherein:

the upper groove section includes a first upper groove extending longitudinally along at least a first portion of the spacer and shaped and configured to receive at least a portion of a lower end edge of the first frame of a battery module of the battery modules located on an upper side, and a second upper groove extending longitudinally along at least a second portion of the spacer and shaped to receive at least a portion of a lower end edge of the second frame of the battery module located on the upper side, and the lower groove section includes a first lower groove extending longitudinally along at least a third portion of the spacer and shaped and configured to receive at least a portion of an upper end edge of the first frame of a battery module of the batter modules located on a lower side, and a second lower groove extending longitudinally along at least a fourth portion of the spacer and shaped to receive at least a portion of an upper end edge of the second frame of the battery module located on the lower side.

2. The spacer according to claim 1, wherein the battery modules each include a positioning convex section used for performing positioning at an intended installation position, and the spacer further comprises:

receiving concave sections shaped to fit the positioning convex sections within the receiving concave sections, the receiving concave sections provided in the first upper groove, the second upper groove, the first lower groove, and the second lower groove at respective portions corresponding to the positioning convex sections.

* * * * *